June 30, 1931.   P. COTA   1,811,917
RECLINING SEAT BACK
Filed Aug. 20, 1930   2 Sheets-Sheet 2
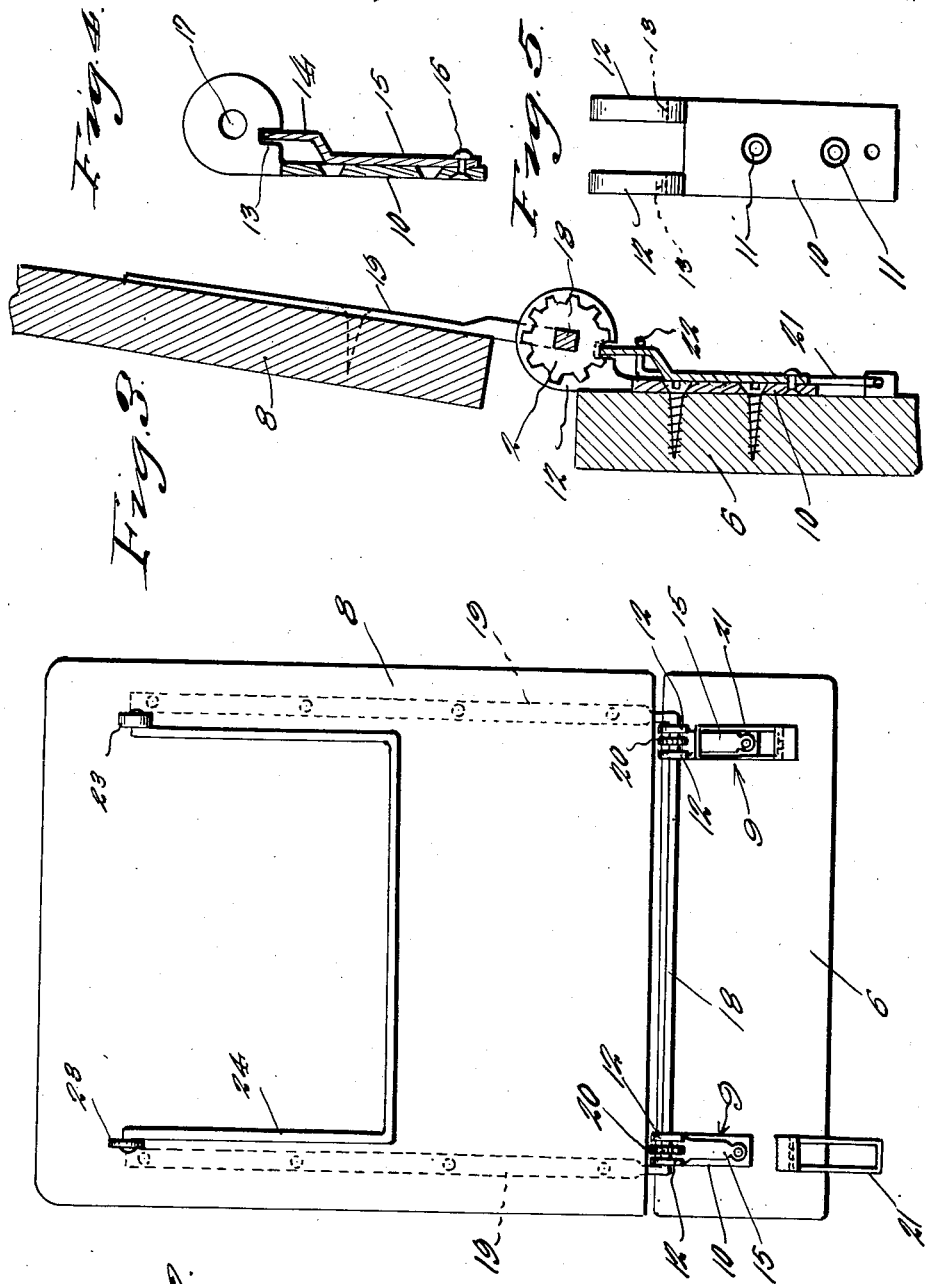
Inventor
Phillip Cota
By Clarence A. O'Brien
Attorney Patented June 30, 1931

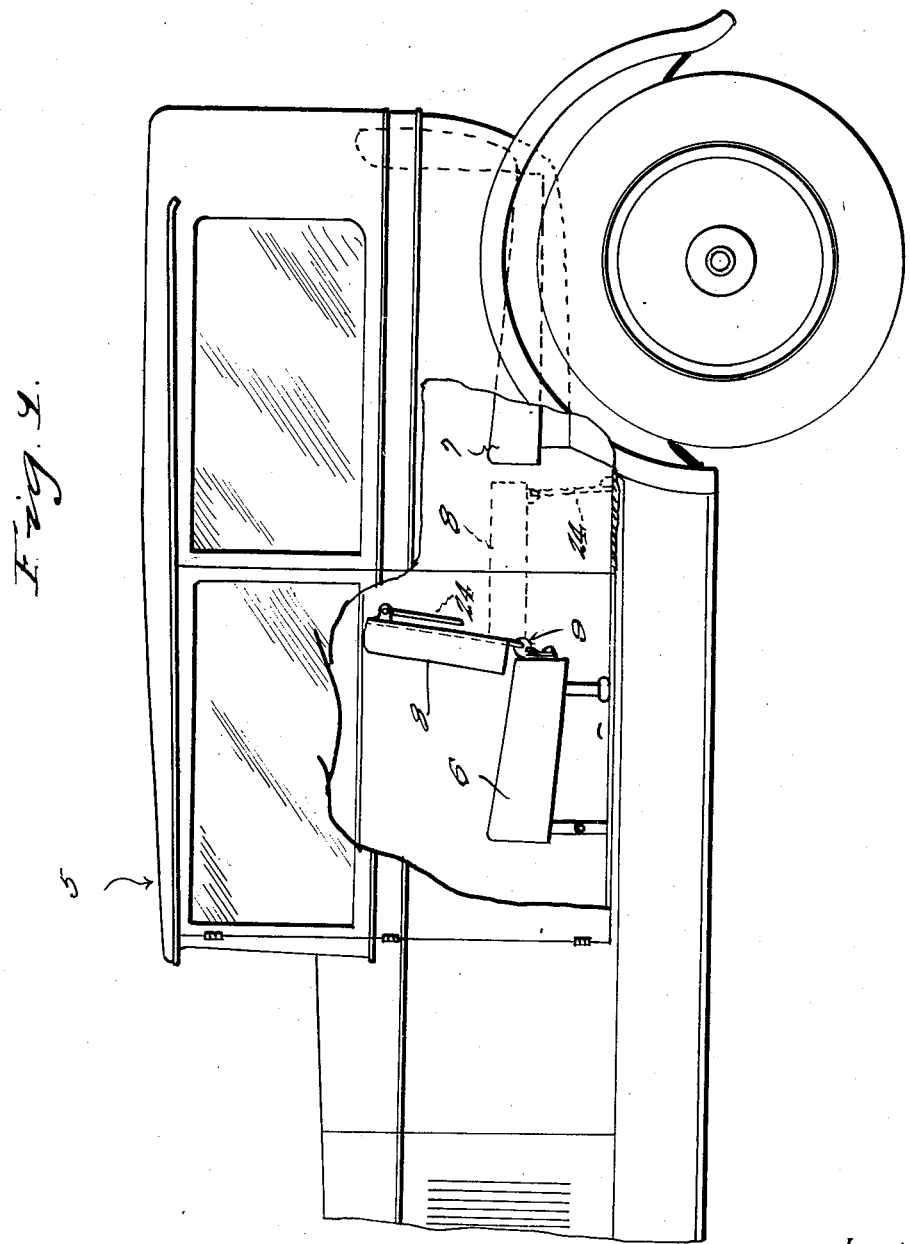

1,811,917

UNITED STATES PATENT OFFICE

PHILLIP COTA, OF KANKAKEE, ILLINOIS

RECLINING SEAT BACK

Application filed August 20, 1930. Serial No. 476,687.

This invention appertains to new and useful improvements in reclining seat backs, particularly adapted for use in automobiles.

The principal object of this invention is to provide a reclining seat back capable of being swung backwardly to assume a horizontal position whereby the front seat can be used in cooperation with the back seat of a sedan or coach type of automobile to serve as a bed.

Another important object of the invention is to provide a reclining seat back which can be adjusted to either an upright or horizontal position in a quick and convenient manner.

These and other important objects and advantages of the invention will readily become apparent to the reader of the following specification.

In the drawings:—

Figure 1 represents a side elevational view of an automobile with its body partly broken away to disclose the novel seat back construction.

Fig. 2 represents a rear elevational view of the reclining seat back.

Fig. 3 represents a fragmentary vertical sectional view disclosing the manner in which the seat back is secured to the seat.

Fig. 4 represents a detail sectional view of one of the hinge elements.

Fig. 5 represents a front elevational view of one of the hinge elements.

Referring to the drawings wherein like numerals designate like parts, it can be seen that numeral 5 generally refers to an automobile body of the coach type. Numeral 6 represents one of the front seats, while numeral 7 represents the back seat, while numeral 8 represents the back section of the front seat.

In carrying out the present invention it will be seen that a pair of hinge assemblies, each generally referred to by numeral 9 is secured to the rear side of the seat 6, and each of the assemblies includes a rectangular-shaped plate 10 having openings 11 therein for receiving securing means for securing the said plate to the seat 6.

A pair of outwardly disposed ears 12—12 are located at the upper end of each plate 10 and in the lower portion of each of these ears 12 is a notch 13 which can receive the offset free end portion 14 of the pivotally mounted latch 15, which is pivotally connected to the plate 10 as at 16.

Each of the ears 12 is provided with an opening 17 to receive the bight portion 18 of the U-shaped frame 19, which has its leg portion secured to the back section 8.

As is clearly shown in Fig. 3, the bight portion 18 of the U-shaped frame 19 is square in cross section for snug disposition thru the square opening in the ratchet wheel 20, one of which is located within each pair of ears 12—12.

It can be observed in Fig. 3, that when the latch 15 is disposed to assume the vertical position, its offset free end portion 14 is engaged within the notches 13 of its corresponding pair of ears 12—12 and also between certain teeth of the adjacent ratchet wheel 20, thus preventing the seat back from swinging backwardly.

In conjunction with the latch 15, a bail 21 is employed and provided with free end portions 22, which when in an upwardly disposed position will engage the offset end portion 14 of the corresponding latch 15 to prevent displacement of the latch from its corresponding ratchet wheel 20.

It can be seen that the upper end of each leg of the U-shaped frame 19 is provided with an ear 23 which is apertured to receive the corresponding outwardly disposed end of the U-shaped support 24 which serves as a lap robe holder when the back section 8 is in upright position.

When the back section 8 is in a reclining position, the support 24 assumes a position perpendicular to the floor of the automobile, as shown in dotted lines in Fig. 1, so as to support the back section 8 in a proper plane with respect to the back seat 7.

The foregoing specification sets forth the invention in specific terms, and it is to be understood that changes in the shape, size and materials may be resorted to without departing from the spirit and scope of the invention as claimed hereinafter.

Having thus described my invention what I claim as new is:—

1. A structure of the character described comprising a seat, a back section, a plate secured to the seat and provided with a pair of ears thereon, a rod on the back section passing through the ears, a ratchet wheel on the rod arranged between said ears, said ears being provided with notches, and a pawl member pivoted to the seat and adapted to be swung to a position engaged within the notches in the ears and also between certain teeth of said ratchet wheel to hold the back section against swinging.

2. A structure of the class described comprising a seat, a back section, a U-shaped member having its limbs fastened to the back section with its bight located below the lower end of the section, a pair of plates connected with the rear edge of the seat and each having a pair of perforated ears thereon, through the perforations of which the bight part of the U-shaped member passes, ratchets on the bight, each ratchet being located between a pair of ears, each ear having a notch in its lower part, and a latch member pivoted to each plate and adapted to be swung into a position to engage the notches in the ears and the notch in the ratchet to hold the back section in adjusted position.

In testimony whereof I affix my signature.

PHILLIP COTA.